(12) United States Patent
Kawaguchi

(10) Patent No.: US 9,817,154 B2
(45) Date of Patent: Nov. 14, 2017

(54) ACRYLIC RESIN FILM AND RETROREFLECTIVE SHEET

(71) Applicant: Mitsubishi Rayon Co., Ltd., Tokyo (JP)

(72) Inventor: Yuji Kawaguchi, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 215 days.

(21) Appl. No.: 14/419,817

(22) PCT Filed: Aug. 5, 2013

(86) PCT No.: PCT/JP2013/071113
§ 371 (c)(1),
(2) Date: Feb. 5, 2015

(87) PCT Pub. No.: WO2014/024821
PCT Pub. Date: Feb. 13, 2014

(65) Prior Publication Data
US 2015/0198743 A1 Jul. 16, 2015

(30) Foreign Application Priority Data
Aug. 6, 2012 (JP) .................... 2012-173710

(51) Int. Cl.
| | | |
|---|---|---|
| *C08K 5/00* | (2006.01) |
| *G02B 1/04* | (2006.01) |
| *C08J 5/18* | (2006.01) |
| *G02B 5/12* | (2006.01) |
| *C08L 33/12* | (2006.01) |

(52) U.S. Cl.
CPC ............... *G02B 1/041* (2013.01); *C08J 5/18* (2013.01); *C08K 5/0041* (2013.01); *C08L 33/12* (2013.01); *G02B 5/12* (2013.01); *C08J 2333/00* (2013.01); *C08J 2333/08* (2013.01); *C08J 2333/10* (2013.01); *C08J 2333/12* (2013.01); *C08L 2203/16* (2013.01)

(58) Field of Classification Search
CPC ............................. C08K 5/0041; G02B 5/12
USPC .......................................... 523/172
See application file for complete search history.

(56) References Cited

U.S. PATENT DOCUMENTS

| | | |
|---|---|---|
| 5,672,643 A | 9/1997 | Burns et al. |
| 5,674,622 A | 10/1997 | Burns et al. |
| 5,754,337 A | 5/1998 | Burns et al. |
| 5,920,429 A | 7/1999 | Burns et al. |
| 6,764,766 B2 | 7/2004 | Kitaike et al. |
| 2003/0032722 A1 | 2/2003 | Kitaike et al. |

FOREIGN PATENT DOCUMENTS

| | | |
|---|---|---|
| CN | 1375517 A | 10/2002 |
| JP | 2001-518550 A | 10/2001 |
| JP | 2002-189125 A | 7/2002 |
| JP | 2005-008845 A | 1/2005 |
| JP | 2005-8846 A | 1/2005 |
| JP | 2005-112982 A | 4/2005 |
| JP | 2008-526568 A | 7/2008 |
| JP | 2008-208197 A | 9/2008 |
| JP | 2009-227831 A | 10/2009 |
| JP | 2011-032328 A | 2/2011 |
| JP | 2011-052157 A | 3/2011 |
| WO | 99/16847 A1 | 4/1999 |
| WO | 2006/074766 A1 | 7/2006 |

OTHER PUBLICATIONS

JP 2005-112982 machine translation. Original document dated (2005).*
International Search Report issued in corresponding International Patent Application No. PCT/JP2013/071113 dated Aug. 27, 2013.
Evonik Industries, "Acrylite® acrylic sheet, Color Reference Guide, Old Cyro Color # / New Evonik Color # / Color Description / Trans. Type," retrieved from the internet: URL: http://corpo.polyalto.com/webdocs/435/1423FColor-ReferenceEnvonikCyro.pdf (retrieved on Aug. 6, 2015).
Extended European Search Report issued in counterpart European Application No. 13827961.7 dated Aug. 17, 2015.
Office Action issued in counterpart Chinese Patent Application No. 201380041611.4 dated Apr. 5, 2017.

* cited by examiner

*Primary Examiner* — Edward Cain
(74) *Attorney, Agent, or Firm* — Morgan, Lewis & Bockius LLP (57) ABSTRACT

An objective of the present invention is to provide an acrylic resin film having a violet color. The present invention is an acrylic resin film composed of an acrylic resin composition including an acrylic resin (A) and a coloring agent (B) composed of at least one selected from: a red coloring agent; a blue coloring agent; and a violet coloring agent, in which a chromatic coordinate (x, y) according to the XYZ colorimetric system under predetermined measurement conditions is within a range surrounded by four points (0.145, 0.025), (0.270, 0.240), (0.550, 0.340), and (0.600, 0.202).

15 Claims, 3 Drawing Sheets

ACRYLIC RESIN FILM AND RETROREFLECTIVE SHEET

TECHNICAL FIELD

The present invention relates to an acrylic resin film having a violet color. In addition, the present invention relates to an acrylic resin film that is preferably used as a surface material for a retroreflective sheet. Furthermore, the present invention relates to a retroreflective sheet in which the acrylic resin film is used as the surface material.

BACKGROUND ART

A retroreflective sheet that reflects incident light toward a light source is conventionally well known, and is employed in various fields leveraging its retroreflective property and superior visual recognizability in dark places.

For example, a sign such as a street sign and a construction sign employing a retroreflective sheet reflects light from a light source of a headlight of a car running in the dark places for example at night toward the light source, in other words toward the running car, thereby providing superior visual recognizability to a driver of the car who is a recognizer of the sign and allowing clear communication of information.

As a retroreflective sheet employed in the abovementioned application, an encapsulated-lens retroreflective sheet and a prism-type retroreflective sheet (for example a triangular pyramid type cube corner retroreflective sheet), which is superior in the retroreflective property, are more and more widely employed from year to year.

By employing a colored acrylic resin film as a surface material for the retroreflective sheet used as a street sign and a construction sign, superior properties such as weather resistance and visual recognizability can be provided to the retroreflective sheet.

As a colored acrylic resin film for the retroreflective sheet surface material, a colored acrylic resin film of which chromatic coordinate (x, y) according to the XYZ colorimetric system is within a specific range is disclosed (Patent Documents 1 and 2).

Colors of the colored retroreflective sheet are white, yellow, red, orange, green, and blue, and a chromatic coordinate is defined for each color in the standard.

Patent Document 1: Japanese Unexamined Patent Application, Publication No. 2005-112982
Patent Document 2: Japanese Unexamined Patent Application, Publication No. 2008-208197

DISCLOSURE OF THE INVENTION

Problems to be Solved by the Invention

However, colors other than those defined in the standard are awaited to be developed.

An objective of the present invention is to provide an acrylic resin film having a violet color.

Means for Solving the Problems

The abovementioned problem is solved by any one of the present invention [1] to [15] below.

[1] An acrylic resin film comprising an acrylic resin composition including an acrylic resin (A) and a coloring agent (B) composed of at least one of: a red coloring agent; a blue coloring agent; and a violet coloring agent, in which a chromatic coordinate (x, y) according to the XYZ colorimetric system under the following measurement conditions is within a range surrounded by four points (0.145, 0.025), (0.270, 0.240), (0.550, 0.340), and (0.600, 0.202).

Measurement conditions: The acrylic resin film and a standard white board are layered and the acrylic resin film side is measured by reflection measurement with 0° illumination, 45° circumferential light receiving, standard light D65, visual field 10°. It should be noted that the standard white board used here is a standard white board that gives XYZ according to the XYZ colorimetric system X=93.96, Y=95.90, Z=113.05 when measured by reflection measurement with 0° illumination, 45° circumferential light receiving, standard light C, visual field 2°.

[2] The acrylic resin film according to [1], in which a content of the coloring agent (B) with respect to 100 parts by mass of the acrylic resin (A) is 0.3 to 3.0 parts by mass.

[3] The acrylic resin film according to [1] or [2], in which a haze of the acrylic resin film is 0.10 to 10%.

[4] The acrylic resin film according to any one of [1] to [3], in which the coloring agent (B) includes at least a violet coloring agent containing a violet dye, and a content of the violet dye with respect to 100 parts by mass of the acrylic resin (A) is 0.5 to 3.0 parts by mass.

[5] The acrylic resin film according to [4], in which thermal weight loss of the violet dye between 40° C. and 250° C. under the following measurement conditions is no greater than 1.0%.

Measurement conditions Test atmosphere: Inert gas atmosphere
Test temperature: 40 to 500° C.
Rate of temperature increase: 10° C./min

[6] The acrylic resin film according to any one of [1] to [5], in which: the coloring agent (B) includes a blue coloring agent containing a blue pigment and/or a red coloring agent containing a red pigment; and a content of the blue pigment and/or the red pigment with respect to 100 parts by mass of the acrylic resin (A) is 0.001 to 1.0 parts by mass.

[7] The acrylic resin film according to any one of [1] to [6], in which a ratio of a total amount of the pigment to a total amount of the dye (total amount of pigment/total amount of dye) is ⅓ to 1/70.

[8] The acrylic resin film according to any one of [1] to [7], in which: the chromatic coordinate (x, y) is within the abovementioned range before and after a weathering test; and a shift in the chromatic coordinate (x, y) before and after a weathering test is within ±0.050 in an x-axis direction and within ±0.020 in a y-axis direction.

[9] A retroreflective sheet including the acrylic resin film according to any one of [1] to [8], in which a chromatic coordinate (x, y) of the retroreflective sheet according to the XYZ colorimetric system is within the abovementioned range.

[10] The retroreflective sheet according to [9], in which the Y value of the retroreflective sheet according to the XYZ colorimetric system is 1.5 to 7.5.

[11] The retroreflective sheet according to [9] or [10], in which a reflector element layer is a bead-shaped lens or a prism-shaped lens.

[12] The retroreflective sheet according to any one of [9] to [11], in which: the chromatic coordinate (x, y) is within the abovementioned range before and after a weathering test; and a shift in the chromatic coordinate (x, y) before and after a weathering test is within ±0.050 in an x-axis direction and within ±0.020 in a y-axis direction.

[13] A retroreflective sheet comprising a reflector element layer, in which a chromatic coordinate (x, y) according to the XYZ colorimetric system under the following measurement conditions is within a range surrounded by four points (0.145, 0.025), (0.270, 0.240), (0.550, 0.340), and (0.600, 0.202).

Measurement conditions: The retroreflective sheet and a standard white board are layered and the retroreflective sheet side is measured by reflection measurement with 0° illumination, 45° circumferential light receiving, standard light D65, visual field 10°. It should be noted that the standard white board used here is a standard white board that gives XYZ according to the XYZ colorimetric system X=93.96, Y=95.90, Z=113.05 when measured by reflection measurement with 0° illumination, 45° circumferential light receiving, standard light C, visual field 2°.

[14] The retroreflective sheet according to [13], in which the Y value according to the XYZ colorimetric system is 1.5 to 7.5.

[15] The retroreflective sheet according to [13] or [14], in which the reflector element layer is a bead-shaped lens or a prism-shaped lens.

Effects of the Invention

The present invention can provide an acrylic resin film having a violet color that is superior in weather resistance and transparency, as well as a retroreflective sheet employing the film.

PREFERRED MODE FOR CARRYING OUT THE INVENTION

<<Acrylic Resin (A)>>

As the acrylic resin (A), for example, the following rubber containing polymer (A-1) and/or a thermoplastic polymer (A-2) can be used.

<Rubber Containing Polymer (A-1)>

The rubber containing polymer (A-1) is a rubber containing polymer obtained by polymerizing a monomer component (A-1-b) containing alkyl methacrylate as an essential component under the presence of a rubber polymer (A1a) obtained by polymerizing a monomer component (A-1-a) containing alkyl acrylate and a polyfunctional monomer as essential components.

It should be noted that "(meth)acryl" in the present specification indicates "acryl" or "methacryl".

As alkyl acrylate which is an essential component of the monomer component (A-1-a), methyl acrylate, ethyl acrylate, propyl acrylate, n-butyl acrylate, 2-ethyl hexyl acrylate, and n-octyl acrylate can be exemplified. Among these, n-butyl acrylate is preferred. These may be used singly or in combination of two or more kinds.

As the multifunctional monomer which is an essential component of the monomer component (A-1-a), a crosslinkable monomer having at least two copolymerizable double bonds in one molecule can be exemplified. As the polyfunctional monomer, alkylene glycol di(meth)acrylate such as ethylene glycol di(meth)acrylate, 1,3-butyleneglycol di(meth)acrylate, 1,4-butyleneglycol di(meth)acrylate, propyleneglycol di(meth)acrylate and the like;

polyvinyl benzene such as divinylbenzene, trivinylbenzene and the like;

cyanurate monomers such as triallyl cyanurate, triallyl isocyanurate and the like;

α,β-unsaturated carboxylic acid such as allyl methacrylate and the like; and allyl, methallyl, or crotyl ester of dicarboxylic acid and the like can be exemplified. These may be used singly or in combination of two or more kinds.

As a monomer other than the alkyl acrylate and the polyfunctional monomer in the monomer component (A-1-a), alkyl methacrylate, or other monomer (hereinafter referred to as "other monomer a") having a double bond which can copolymerize with these (alkyl acrylate and the polyfunctional monomer) can be exemplified.

As alkyl methacrylate, one with straight chain or branched chain alkyl group can be exemplified.

As a specific example of alkyl methacrylate: methyl methacrylate, ethyl methacrylate, propyl methacrylate, and n-butyl methacrylate can be exemplified. These may be used singly or in combination of two or more kinds.

As the other monomer a, acrylic monomers such as acrylic acid lower alkoxy, acrylic acid cyanoethyl, acrylamide, (meth)acrylic acid and the like; aromatic vinyl monomers such as styrene, alkyl-substituted styrene, and the like; and vinyl cyanide monomers such as acrylonitrile, methacrylonitrile, and the like can be exemplified. These may be used singly or in combination of two or more kinds.

The monomer component (A-1-a) can contain a chain transfer agent.

As the chain transfer agent, alkyl mercaptan having a carbon number of 2 to 20, mercapto acids, thiophenol, and carbon tetrachloride can be exemplified. These may be used singly or in combination of two or more kinds. As the chain transfer agent, n-octylmercaptan can be exemplified.

The content of alkyl acrylate in the monomer component (A-1-a) is preferably 40 to 99.9% by mass.

The content of alkyl methacrylate in the monomer component (A-1-a) is preferably 0 to 59.9% by mass.

The content of the other monomer having a double bond which can copolymerize with these in the monomer component (A-1-a) is preferably 0 to 30%.

The content of the polyfunctional monomer in the monomer component (A-1-a) is preferably 0.1 to 10% by mass.

The glass transition temperature (hereinafter referred to as Tg) of the rubber polymer (A1a) is preferably no greater than 25° C., more preferably no greater than 10° C., and most preferably no greater than 0° C. from the viewpoint of flexibility of the rubber containing polymer (A-1). The Tg of the rubber polymer (A1a) is preferably at least −100° C. and more preferably at least −50° C.

It should be noted that, in the present invention, the Tg is a value calculated by the FOX formula using the values specified in Polymer Handbook (J. Brandrup, Interscience, 1989).

An amount of the monomer component (A-1-a) used upon manufacture of the rubber containing polymer (A-1) (monomer component (A-1-a)+monomer component (A-1-b)+monomer component (A-1-c)=100% by mass) is preferably 5 to 70% by mass, and more preferably 20 to 60% by mass from the viewpoint of film forming property, molding whitening resistance, heat resistance, and flexibility.

The rubber containing polymer (A-1) is a rubber containing polymer obtained by polymerizing a monomer component (A-1-b) containing alkyl methacrylate as an essential component under the presence of a rubber polymer (A1a).

The monomer component (A-1-b) can contain, in addition to alkyl methacrylate or alkyl acrylate, other monomer (hereinafter also referred to as "other monomer b") having a double bond which can copolymerize with these. The monomer component (A-1-b) can also contain a chain transfer agent. As the chain transfer agent, specifically, those listed in the description of the rubber polymer (A1a) can be used.

The content of alkyl methacrylate in the monomer component (A-1-b) is preferably 51 to 100% by mass. As alkyl methacrylate, those listed for the monomer component (A-1-a) can be used.

The content of alkyl acrylate in the monomer component (A-1-b) is preferably 0 to 20% by mass. As alkyl acrylate, those listed for the monomer component (A-1-a) can be used.

The content of the other monomer b in the monomer component (A-1-b) is preferably 0 to 49% by mass. The same monomer as the other monomer a can be used as the other monomer b.

An amount of the monomer component (A-1-b) used upon manufacture of the rubber containing polymer (A-1) (monomer component (A-1-a)+monomer component (A-1-b)+monomer component (A-1-c)=100% by mass) is preferably 20 to 95% by mass, and more preferably 30 to 80% by mass from the viewpoint of film forming property, molding whitening resistance, heat resistance, and flexibility.

Before polymerizing the monomer component (A-1-b), the monomer component (A-1-c) containing: 9.9 to 90% by mass of alkyl acrylate; 9.9 to 90% of alkyl methacrylate; 0 to 20% by mass of the other monomer having a double bond which can copolymerize with these (alkyl acrylate or alkyl methacrylate); and 0.1 to 10% by mass of the polyfunctional monomer can be polymerized. The monomer component (A-1-c) can also contain a chain transfer agent. As the chain transfer agent, specifically, those listed in the description of the rubber polymer (A1a) can be used.

The Tg of the polymer obtained by polymerizing the monomer component (A-1-c) is preferably higher than the Tg of the rubber like polymer (A1a) from the viewpoint of molding whitening resistance of the acrylic resin film.

The composition of the monomer component (A-1-c) is preferably different from the composition of the monomer component (A-1-a). By differentiating the monomer component (A-1-a) from the monomer component (A-1-c) in composition, molding whitening resistance of the acrylic resin film can be easily improved.

It should be noted that the expression "different composition" with regard to polymers indicates that at least one of type and content of monomers composing the polymer is different.

The lower limit of the Tg of the polymer alone obtained from the monomer component (A-1-c) is preferably at least 10° C. from the viewpoint of heat resistance and flexibility. The upper limit of the Tg of the polymer alone obtained from the monomer component (A-1-c) is preferably no greater than 100° C., more preferably no greater than 80° C., and most preferably no greater than 70° C. from the viewpoint of film forming property and molding-whitening resistance.

An amount of the monomer component (A-1-c) used upon manufacture of the rubber containing polymer (A-1) (monomer component (A-1-a)+monomer component (A-1-b)+monomer component (A-1-c)=100% by mass) is preferably 0 to 35% by mass, and more preferably 5 to 20% by mass from the viewpoint of film forming property, molding whitening resistance, heat resistance, and flexibility.

<Method of Producing Rubber Containing Polymer (A-1)>

As a method of producing the rubber containing polymer (A-1), for example, a sequential multistage emulsion polymerization method can be exemplified. In addition, as a method of producing the rubber containing polymer (A-1), for example, an emulsion suspension polymerization method of, under the presence of the rubber like polymer (A1a), after performing sequential multistage emulsion polymerization of the monomer component (A-1-c) as necessary, transferring to a suspension polymerization system upon polymerization of the monomer component (A-1-b) can be exemplified.

As a method of producing the rubber containing polymer (A-1) by sequential multistage emulsion polymerization, for example, a method of supplying the monomer component (A-1-a) for obtaining the rubber like polymer (A1a); water; and a surfactant to a reaction container and polymerizing, and then sequentially supplying the monomer component (A-1-c) and the monomer component (A-1-b) to the reaction container and polymerizing can be exemplified.

The acrylic resin film obtained by using the rubber containing polymer (A-1) obtained by the above described method is preferable for a small number of fish eyes on the film.

As the surfactant used in producing the rubber containing polymer (A-1) by sequential multistage emulsion polymerization, anionic, cationic, and nonionic surfactants can be exemplified. These may be used singly or in combination of two or more kinds.

As the anionic surfactant, for example, carboxylates such as rosin soap, potassium oleate, sodium stearate, sodium myristate, sodium N-lauroyl sarcosinate, dipotassium alkenylsuccinate and the like; sulfuric ester salts such as sodium lauryl sulfate; sulfonates such as sodium dioctyl sulfosuccinate, sodium dodecylbenzenesulfonate, sodium alkyldiphenyl etherdisulfonate and the like; and phosphoric ester salts such as polyoxyethylene alkyl phenyl ether sodium phosphate, polyoxyethylene alkyl ether sodium phosphate and the like can be exemplified.

As a specific example of the anionic surfactant: Eleminol NC-718 manufactured by Sanyo Chemical Industry Co., Ltd.; Phosphanol LS-529, Phosphanol RS-610NA, Phosphanol RS-620NA, Phosphanol RS-630NA, Phosphanol RS-640NA, Phosphanol RS-650NA, and Phosphanol RS-660NA manufactured by Toho Chemical Industry Co., Ltd.; and LATEMUL P-0404, LATEMUL P-0405, LATEMUL P-0406, LATEMUL P-0407 manufactured by Kao Corporation (all of which are trade names) can be exemplified.

As a method of preparing emulsion by blending the monomer component (A-1-a), water, and surfactant, for example: a method of loading the monomer component (A-1-a) in water and then adding the surfactant thereto;
a method of loading the surfactant in water and then adding the monomer component (A-1-a) thereto; and
a method of loading the surfactant in the monomer component (A-1-a) and then adding water thereto can be exemplified.

As a device for preparing the emulsion by blending the monomer component (A-1-a) with water and the surfactant, an agitator with agitator wing, a forced emulsification device such as homogenizer and homomixer, and a membrane emulsification device can be exemplified.

The emulsion of either W/O type in which water droplets are dispersed in oil of the monomer component (A-1-a), or O/W type in which oil droplets of the monomer component (A-1-a) are dispersed in water can be used as the abovementioned emulsion.

It should be noted that, as a polymerization method of the rubber like polymer (A1a), a method of polymerizing the monomer component (A-1-a) at a time, and a method of dividing the monomer component (A-1-a) into two or more and polymerizing in multiple stages can be exemplified. As the monomer component (A-1-a) in a case of polymerizing in multiple stages, a monomer component of the same component can be polymerized in multiple stages and monomer components of different components can be polymerized in multiple stages.

Latex of the rubber containing polymer (A-1) obtained by the above described method can be processed by using a filtration device provided with a filter element as necessary. The filtration process is used for removing, from the latex of the rubber containing polymer (A-1), scale generated during polymerization, or for removing foreign substances in polymerization materials or mixed thereinto from outside during polymerization.

As the abovementioned filtration device provided with a filter element, the GAF filter system manufactured by ISP filters Pte. Ltd. employing a bag-like mesh filter; a centrifugal separation filtration device provided with a cylindrical shaped filter element along an inner face of a cylindrical filtration chamber and an agitator wing in the filter element; and a vibration filtration device in which a filter element conducts horizontal circular motion and vertical vibration motion with respect to the filter element face can be exemplified.

The rubber containing polymer (A-1) can be obtained as a powdery matter by collecting from the latex of the rubber containing polymer (A-1).

As a method for collecting the rubber containing polymer (A-1) from the latex of the rubber containing polymer (A-1), methods such as: coagulation by salt deposition or acid deposition; spray drying; and freeze drying can be exemplified.

In a case of collecting the rubber containing polymer (A-1) by coagulation by salt deposition using metallic salt, the residual metal content in the finally obtained rubber containing polymer (A-1) is preferably no greater than 800 ppm, and a lower residual metal content is more preferable.

In a case of using metallic salt having a strong affinity for water such as calcium, magnesium, sodium and the like as the metallic salt in the salt deposition, by reducing the residual metal content in the rubber containing polymer (A-1) as much as possible, whitening during immersion of the acrylic resin film in boiling water can be easily suppressed.

As a polymerization initiator used upon polymerization of the monomer component (A-1-a), monomer component (A-1-b), and monomer component (A-1-c) in the rubber containing polymer (A-1), well-known polymerization initiators can be used. As a method of adding the polymerization initiator, a method of adding to any one of, and a method of adding to both of, an aqueous phase and a monomer phase can be exemplified.

As the abovementioned polymerization initiator, peroxide, an azo initiator, and a redox initiator in which peroxide or an azo initiator is combined with an oxidant/reducing agent can be exemplified.

As a specific example of the redox initiator, a sulfoxylate initiator in which ferrous sulfate, disodium ethylenediaminetetraacetate salt, Rongalite, and hydroperoxide are combined can be exemplified. As hydroperoxide, cumene hydroperoxide and t-butyl hydroperoxide can be specifically exemplified.

In a case of producing the latex of the rubber containing polymer (A-1) by a method of supplying emulsion prepared by blending the monomer component (A-1-a) with water and surfactant to a reaction container to polymerize, and then sequentially supplying the monomer component (A-1-c) and the monomer component (A-1-b) to the reaction container to polymerize, a method of heating an aqueous solution containing ferrous sulfate, disodium ethylenediaminetetraacetate salt, and Rongalite in the polymerization container up to a polymerization temperature, then supplying emulsion prepared by blending the monomer component (A-1-a) with water and surfactant to the reaction container to polymerize, and then sequentially supplying the monomer component (A-1-c) and the monomer component (A-1-b) to the reaction container to polymerize is preferable.

The polymerization temperature for obtaining the latex of the rubber containing polymer (A-1) may vary depending on a type and amount of the polymerization initiator to be used, and 40 to 120° C. can be exemplified.

<Thermoplastic Polymer (A-2)>

The thermoplastic polymer (A-2) is a polymer composed mainly of an alkyl methacrylate unit.

As the polymer composed mainly of an alkyl methacrylate unit, a polymer that can be obtained by polymerizing a monomer component containing: 50 to 100% by mass of alkyl methacrylate; 0 to 50% by mass of alkyl acrylate; and 0 to 49% of the other monomer having a double bond which can copolymerize with these is preferable from the viewpoint of heat resistance of the acrylic resin film.

As these monomers, those listed in the description of the rubber polymer (A1a) can be used. These may be used singly or in combination of two or more kinds.

The content of alkyl methacrylate is preferably 50 to 100% by mass, more preferably 85 to 99.9% by mass, and most preferably 92 to 99.9% by mass from the viewpoint of heat resistance of the acrylic resin film.

The content of alkyl acrylate is preferably 0 to 40% by mass, more preferably 0.1 to 15% by mass, and most preferably 0.1 to 8% by mass from the viewpoint of heat resistance of the acrylic resin film.

The content of the other monomer having a double bond which can copolymerize with these is preferably 0 to 49% by mass, more preferably 0 to 35% by mass from the viewpoint of heat resistance of the acrylic resin film.

As the thermoplastic polymer (A-2), one having reduced viscosity of polymer (0.1 g of polymer dissolved in 100 ml of chloroform, measured at 25° C.) of no greater than 0.1 L/g is preferred.

As a method of polymerizing the thermoplastic polymer (A-2), suspension polymerization, emulsion polymerization, and bulk polymerization can be exemplified.

The acrylic resin (A) preferably contains the rubber containing polymer (A-1) and the thermoplastic polymer (A-2). Heat resistance and flexibility of the acrylic resin film can be easily adjusted by changing proportions of the rubber containing polymer (A-1) and the thermoplastic polymer (A-2).

Content of the rubber containing polymer (A-1) in the acrylic resin is not particularly limited; however, is preferably 10 to 100% by mass, and more preferably 20 to 95% by mass. Content of the thermoplastic polymer (A-2) in the acrylic resin is not particularly limited; however, is preferably 0 to 90% by mass, and more preferably 5 to 80% by mass. Contents of the rubber containing polymer (A-1) and the thermoplastic polymer (A-2) in the acrylic resin are not particularly limited; however are preferably 10 to 100% by mass for the rubber containing polymer (A-1) and 0 to 90% by mass for the thermoplastic polymer (A-2), and more preferably 20 to 95% by mass for the rubber containing polymer (A-1) and 5 to 80% by mass for the thermoplastic polymer (A-2).

<Coloring Agent (B)>

The coloring agent (B) used in the present invention is composed of at least one of: a red coloring agent; a blue coloring agent; and a violet coloring agent. Conventionally known coloring agents can be selected to be used as long as an acrylic resin film obtained by shaping an acrylic resin composition containing the acrylic resin (A) and the coloring agent (B) into a film that has a chromatic coordinate (x, y) according to the XYZ colorimetric system under the following measurement conditions (I) being within a range (X) surrounded by four points (0.145, 0.025), (0.270, 0.240), (0.550, 0.340), and (0.600, 0.202) can be obtained.

Measurement condition (I): The acrylic resin film and a standard white board are layered and the acrylic resin film side is measured by reflection measurement with 0° illumination, 45° circumferential light receiving, standard light D65, visual field 10°. It should be noted that the standard white board used here is a standard white board that gives XYZ according to the XYZ colorimetric system X=93.96, Y=95.90, Z=113.05 when measured by reflection measurement with 0° illumination, 45° circumferential light receiving, standard light C, visual field 2°.

The red coloring agent can contain any one or both of a red dye and a red pigment.

Any one of a water soluble dye, a disperse dye, an oil soluble dye and the like can be used as the red dye, and an oil soluble dye and a disperse dye are preferable from the viewpoint of weather resistance, molding whitening resistance, dispersibility in acrylic resin and the like.

Any of an inorganic pigment and an organic pigment can be used as the red pigment, and an organic pigment is preferably used from the viewpoint of vividness of color after coloring.

In addition, conventionally known coloring agents can be used as the red coloring agent in the present invention as long as a chromatic coordinate (x, y) under the abovementioned measurement conditions (I) of an acrylic resin film of 75 μm obtained by adding 0.5 to 2.0 parts by mass of the red coloring agent to 100 parts by mass of the acrylic resin (A) is within a range surrounded by four points (0.648, 0.351), (0.735, 0.265), (0.629, 0.281) and (0.565, 0.346).

As a specific example of the red disperse dye, C. I. DisperseRed 1, 4, 5, 7, 13, 17, 19, 43, 50, 54, 58, 65, 72, 73, 74, 88, 117, 137, 143, 177, 179, 199, 200, 210, 221, 227, 311, 343 and the like can be exemplified.

As a specific example of the oil soluble red dye, C. I. SolventRed 1, 3, 8, 22, 23, 24, 25, 27, 49, 52, 109, 111, 119, 122, 135, 149, 150, 169, 172, 195, 197, 222, 227, 312, 313 and the like can be exemplified.

As a specific example of the red organic pigment, C. I. PigmentRed 1, 2, 3, 4, 5, 6, 7, 8, 9, 12, 14, 15, 16, 17, 21, 22, 23, 31, 32, 37, 38, 41, 47, 48, 48:1, 48:2, 48:3, 48:4, 49, 49:1, 49:2, 50:1, 52:1, 52:2, 53, 53:1, 53:2, 53:3, 57, 57:1, 57:2, 58:4, 60, 63, 63:1, 63:2, 64, 64:1, 68, 69, 81, 81:1, 81:2, 81:3, 81:4, 83, 88, 90:1, 101, 101:1, 104, 108, 108:1, 109, 112, 113, 114, 122, 123, 144, 146, 147, 149, 151, 166, 168, 169, 170, 172, 173, 174, 175, 176, 177, 178, 179, 181, 184, 185, 187, 188, 190, 193, 194, 200, 202, 206, 207, 208, 209, 210, 214, 216, 220, 221, 224, 230, 231, 232, 233, 235, 236, 237, 238, 239, 242, 243, 245, 247, 249, 250, 251, 253, 254, 255, 256, 257, 258, 259, 260, 262, 263, 264, 265, 266, 267, 268, 269, 270, 271, 272, 273, 274, 275, 276 and the like can be exemplified. As an example of commercially available product, DIMICMBR-155 Red (manufactured by Dainichiseika Color & Chemicals Mfg. Co., Ltd.) and DIMIC-MBR-165 Red (manufactured by Dainichiseika Color & Chemicals Mfg. Co., Ltd.) containing an anthraquinone based red pigment (C. I. PigmentRed 177) as a main component can be exemplified.

The blue coloring agent can contain any one or both of a blue dye and a blue pigment.

Any one of a water soluble dye, a disperse dye, an oil soluble dye and the like can be used as the blue dye, and an oil soluble dye and a disperse dye are preferable from the viewpoint of weather resistance, molding whitening resistance, dispersibility in acrylic resin and the like.

Any of an inorganic pigment and an organic pigment can be used as blue pigment, and an organic pigment is preferably used from the viewpoint of vividness of color after coloring.

In addition, conventionally known coloring agents can be used as the blue coloring agent in the present invention as long as a chromatic coordinate (x, y) under the abovementioned measurement conditions (I) of an acrylic resin film of 75 μm obtained by adding 0.5 to 2.0 parts by mass of the blue coloring agent to 100 parts by mass of the acrylic resin (A) is within a range surrounded by four points (0.140, 0.035), (0.244, 0.210), (0.190, 0.255) and (0.065, 0.216).

As a specific example of the blue disperse dye, C. I. DisperseBlue 1, 3, 14, 24, 27, 35, 56, 60, 64, 72, 77, 81, 87, 96, 102, 130, 165, 165:1, 165:2, 165:5, 183:1, 214, 257, 291, 291:1, 301, 354, 359, 373 and the like can be exemplified.

As a specific example of the oil soluble blue dye, C. I. SolventBlue 4, 5, 35, 36, 38, 45, 59, 63, 68, 70, 78, 97, 101, 102, 104, 122 and the like can be exemplified.

As a specific example of the blue organic pigment, C. I. PigmentBlue 1, 1:2, 9, 14, 15, 15:1, 15:2, 15:3, 15:4, 15:6, 16, 17, 19, 25, 27, 28, 29, 33, 35, 36, 56, 56:1, 60, 61, 61:1, 62, 63, 66, 67, 68, 71, 72, 73, 74, 75, 76, 78, 79 and the like can be exemplified.

As an example of commercially available product, DIMICMBR-653 Blue (manufactured by Dainichiseika Color & Chemicals Mfg. Co., Ltd.) containing a phthalocyanine based blue pigment (C. I. PigmentBlue 15:1) as a main component can be exemplified.

The violet coloring agent can contain any one or both of a violet dye and a violet pigment. Any one of a water soluble dye, a disperse dye, an oil soluble dye and the like can be used as the violet dye, and an oil soluble dye and a disperse dye are preferable from the viewpoint of weather resistance, molding whitening resistance, dispersibility in acrylic resin and the like.

Any of an inorganic pigment and an organic pigment can be used as violet pigment, and an organic pigment is preferably used from the viewpoint of vividness of color after coloring.

In addition, conventionally known coloring agents can be used as the violet coloring agent in the present invention as long as a chromatic coordinate (x, y) under the abovementioned measurement conditions (I) of an acrylic resin film of 75 μm obtained by adding 0.5 to 2.0 parts by mass of the violet coloring agent to 100 parts by mass of the acrylic resin (A) is within a range surrounded by four points (0.145, 0.025), (0.270, 0.240), (0.550, 0.340) and (0.600, 0.202).

As a specific example of the violet disperse dye, C. I. DisperseViolet 27, 28, 31, 57, 95 and the like can be exemplified.

As the oil soluble violet dye, C. I. SolventViolet 8, 13, 14, 21, 27, 28, 36 and the like can be exemplified.

As an example of commercially available product, DIMICMBR-D32 Red (manufactured by Dainichiseika Color & Chemicals Mfg. Co., Ltd.), which is an anthraquinone based violet dye (C. I. DisperseViolet 31) can be exemplified.

As a specific example of the violet organic pigment, C. I. PigmentViolet 1, 2, 3, 16, 19, 23, 27, 29, 30, 32, 37, 40, 42, 50, 55 and the like can be exemplified.

As an example of commercially available product, DIMICMBR-120220 Violet (manufactured by Dainichiseika Color & Chemicals Mfg. Co., Ltd.), which is a dioxazine based violet pigment (C. I. DisperseViolet 37) can be exemplified.

A content of the coloring agent (B) with respect to 100 parts by mass of the acrylic resin (A) is 0.3 to 3.0 parts by mass. The content of the coloring agent (B) of at least 0.3 parts by mass allows easy coloring of the acrylic resin film of a desired chromatic coordinate (x, y), while the content of the coloring agent (B) of no greater than 3.0 parts by mass allows effective maintenance of transparency of the film. The content of the coloring agent (B) is more preferably 0.4 to 2.7 parts by mass and further more preferably 0.5 to 2.4 parts by mass.

In addition, the coloring agent (B) preferably contains at least a violet coloring agent. Furthermore, it is more preferable that the coloring agent (B) contains at least a violet coloring agent containing a violet dye, and it is preferable that the content of the violet dye with respect to 100 parts by mass of the acrylic resin (A) is 0.5 to 3.0 parts by mass. The content of the violet dye of at least 0.5 parts by mass allows easy coloring of the acrylic resin film of a desired chromatic coordinate (x, y). The content of the violet dye of no greater than 3.0 parts by mass allows effective maintenance of transparency of the film. The content of the violet dye is more preferably 0.6 to 2.7 parts by mass and further more preferably 0.7 to 2.4 parts by mass.

In addition, thermal weight loss of the violet dye between 40° C. and 250° C. under the following measurement conditions is preferably no greater than 1.0%.

Measurement conditions Test atmosphere: Inert gas atmosphere

Test temperature: 40 to 500° C.

Rate of temperature increase: 10° C./min

The thermal weight loss of the violet dye of no greater than 1.0% allows effective suppression of weight loss due to volatilization of the dye during formation of the acrylic resin composition into pellets and into film, thereby stabilizing the chromatic coordinate (x, y) of the film containing the violet dye. The thermal weight loss of the violet dye is more preferably no greater than 0.9% by mass and further more preferably no greater than 0.8% by mass.

It is preferable that the coloring agent (B) contains a blue coloring agent and/or a red coloring agent (in other words, preferably contains any one or both of the blue coloring agent and the red coloring agent), and it is more preferable that the coloring agent (B) contains a blue pigment and/or a red pigment (in other words, more preferably contains any one or both of the blue pigment and the red pigment). A content of the blue pigment and/or the red pigment with respect to 100 parts by mass of the acrylic resin (A) is 0.001 to 1.0 parts by mass. The content of the blue pigment and/or the red pigment of at least 0.001 parts by mass allows coloring of the film of a desired chromatic coordinate (x, y) while allowing effective impartment of weather resistance. The content of the blue pigment and/or the red pigment of no greater than 1.0 part by mass allows effective maintenance of transparency of the film. The content of the blue pigment and/or the red pigment is more preferably 0.003 to 0.8 parts by mass and further more preferably 0.005 to 0.6 parts by mass.

In addition, in a case of including dye and pigment in the coloring agent (B), a ratio of a total amount of the pigment to a total amount of the dye (total amount of the pigment/total amount of dye) is 1/3 to 1/70. The ratio of the total amounts of 1/3 to 1/70 allows easy simultaneous realization of transparency and weather resistance of the film. The ratio of the total amounts is more preferably 1/4 to 1/65 and further more preferably 1/5 to 1/60. Particularly, the ratio of a total amount of the blue pigment, red pigment, and violet pigment to a total amount of the blue dye, red dye, and violet dye is preferably 1/3 to 1/70, more preferably 1/4 to 1/65, and further more preferably 1/5 to 1/60.

<<Acrylic Resin Composition>>

The acrylic resin composition contains the acrylic resin (A) and the abovementioned coloring agent (B), and can contain various additives (described later) as necessary.

As a form of the acrylic resin composition, a block form, a powder form, and a pellet form can be exemplified. Among these, the pellet form is preferable from the viewpoint of handling of the acrylic resin composition.

As a method of adding the coloring agent (B) and various additives to the acrylic resin (A), a method of adding before pelletizing the acrylic resin composition and a method of adding to pelletized acrylic resin (A) can be exemplified. Among these, the method of adding before pelletizing the acrylic resin composition is preferable from the viewpoint of handling of the acrylic resin composition and uneven coloring of the film upon film forming.

Various additives such as stabilizer, lubricant, processing aid, delustrant, light dispersing agent, plasticizer, shock resistant assistant, blowing agent, filler, coloring agent, antibiotics, antimold, release agent, antistatic agent, light stabilizer, UV absorber, anti-oxidant and the like can be included in the acrylic resin composition.

It is preferable that UV absorber and light stabilizer are blended in the acrylic resin composition, in terms of imparting weather resistance to an acrylic resin film for protecting a product employing the acrylic resin film. In addition, it is preferable that anti-oxidant is blended in the acrylic resin composition, in order to suppress thermal coloration during pelletization and film forming.

The molecular weight of the UV absorber blended in the acrylic resin composition is preferably at least 300 and more preferably at least 400. The molecular weight of the UV absorber of at least 300 easily suppresses contamination of a die used for production of an acrylic resin film.

As a type of the UV absorber, a benzotriazole UV absorber and a triazine UV absorber can be exemplified.

As a commercially available benzotriazole UV absorber, TINUVIN 234 manufactured by BASF and Adekastab LA-31 manufactured by ADEKA Corporation (all of which are trade names) can be exemplified.

As a commercially available triazine UV absorber, TTNUVIN 1577 manufactured by BASF and LA-F70 manufactured by ADEKA Corporation (all of which are trade names) can be exemplified. The above listed UV absorbers may be used either singly or in combination of two or more.

The content of the UV absorber is preferably 0.1 to 5 parts by mass, more preferably 0.2 to 4 parts by mass, and further more preferably 0.3 to 3 parts by mass with respect to 100 parts by mass of the acrylic resin (A). The content of the UV absorber of at least 0.1 parts by mass allows impartment of superior weather resistance to the acrylic resin film obtained. The content of the UV absorber of no greater than 5 parts by mass allows maintenance of sufficient weather resistance and suppression of manufacturing cost.

As the light stabilizer, well-known compounds can be used and there is no particular limitation; however, hindered amine radical scavenger is preferably used.

The hindered amine radical scavenger is a compound with a piperidine ring having a plurality of substituents showing a steric hindrance effect on two carbon atoms to which a nitrogen atom is adjacent. As such a substituent showing a steric hindrance effect, a methyl group can be exemplified.

As a preferred example of a compound with such a substituent, a compound with a 2,2,6,6-tetramethyl-4-piperidyl group, and a compound with a 1,2,2,6,6-pentamethyl-4-piperidyl group can be exemplified.

As a commercially available hindered amine radical scavenger or a commercially available composition containing hindered amine radical scavenger: Chimassorb 119FL, 2020FDL, 944FD, 944LD, Tinuvin 622LD, 123S, 144, 765, 770, 770DF, 770FL, 111FD, 123, and 292 (trade names) manufactured by BASF; Sanol LS-770, LS-765, LS-292, LS-2626, LS-744, and LS-440 (trade names) manufactured by Sankyo; Adekastab LA-52, LA-57, LA-62, LA-63P, LA-68, LA-81, LA-82, and LA-87 (trade names) manufactured by ADEKA Corporation; and the like can be exemplified.

The light stabilizers may be used either singly or in combination of two or more.

The content of the light stabilizer is preferably 0.01 to 3 parts by mass, more preferably 0.03 to 2.5 parts by mass, and further more preferably 0.05 to 2 parts by mass with respect to 100 parts by mass of the acrylic resin (A). The content of the light stabilizer of at least 0.01 parts by mass allows impartment of superior weather resistance to the acrylic resin film obtained. The content of the light stabilizer of no greater than 3 parts by mass allows maintenance of sufficient weather resistance and suppression of manufacturing cost.

As the antioxidant, well-known compounds can be used and there is no particular limitation; however, a phenol-based antioxidant is preferably used.

As the phenol-based antioxidant, a hindered phenol-based compound in which a bulky group is present in an ortho position of a hydroxyl group of a phenol-based compound, thereby concealing a characteristic of phenolic hydroxyl group can be exemplified.

As a commercially available antioxidant or a composition containing an antioxidant: IRGANOX1010, IRGANOX1076, IRGANOX1098, IRGANOX245 and IRGANOX3114 (trade names) manufactured by BASF; Adekastab AO-20, AO-50, AO-60, AO-80 and AO-330 (trade names) manufactured by ADEKA Corporation; and the like can be exemplified.

The antioxidants may be used either singly or in combination of two or more.

The content of the antioxidant is preferably 0.01 to 2 parts by mass, more preferably 0.02 to 1.5 parts by mass, and further more preferably 0.03 to 1 parts by mass with respect to 100 parts by mass of the acrylic resin (A). The content of the anti-oxidant of at least 0.01 parts by mass allows suppression of thermal coloration during pelletization and film forming of the acrylic resin. The content of the antioxidant of no greater than 2 parts by mass allows maintenance of sufficient weather resistance and suppression of manufacturing cost.

<<Acrylic Resin Film>>

The acrylic resin film of the present invention is obtained by forming the acrylic resin composition. According to the present embodiment, a violet acrylic resin film can be provided that satisfies a chromatic coordinate (x, y) required for use as a retroreflective sheet, while having superior weather resistance that prevents change in appearance of the retroreflective sheet after a long-term weathering test or exposure to the outside environment.

In the acrylic resin film of the present invention, a chromatic coordinate (x, y) according to the XYZ colorimetric system under the following measurement conditions is within a range surrounded by four points (0.145, 0.025), (0.270, 0.240), (0.550, 0.340), and (0.600, 0.202). A range of (0.160, 0.035), (0.270, 0.230), (0.510, 0.320), and (0.550, 0.190) is more preferable, and a range of (0.190, 0.055), (0.270, 0.220), (0.470, 0.300), and (0.510, 0.180) is further more preferable.

Measurement conditions: The acrylic resin film and a standard white board are layered and the acrylic resin film side is measured by reflection measurement with 0° illumination, 45° circumferential light receiving, standard light D65, visual field 10°. It should be noted that the standard white board used here is a standard white board that gives XYZ according to the XYZ colorimetric system X=93.96, Y=95.90, Z=113.05 when measured by reflection measurement with 0° illumination, 45° circumferential light receiving, standard light C, visual field 2°.

Figure 1:
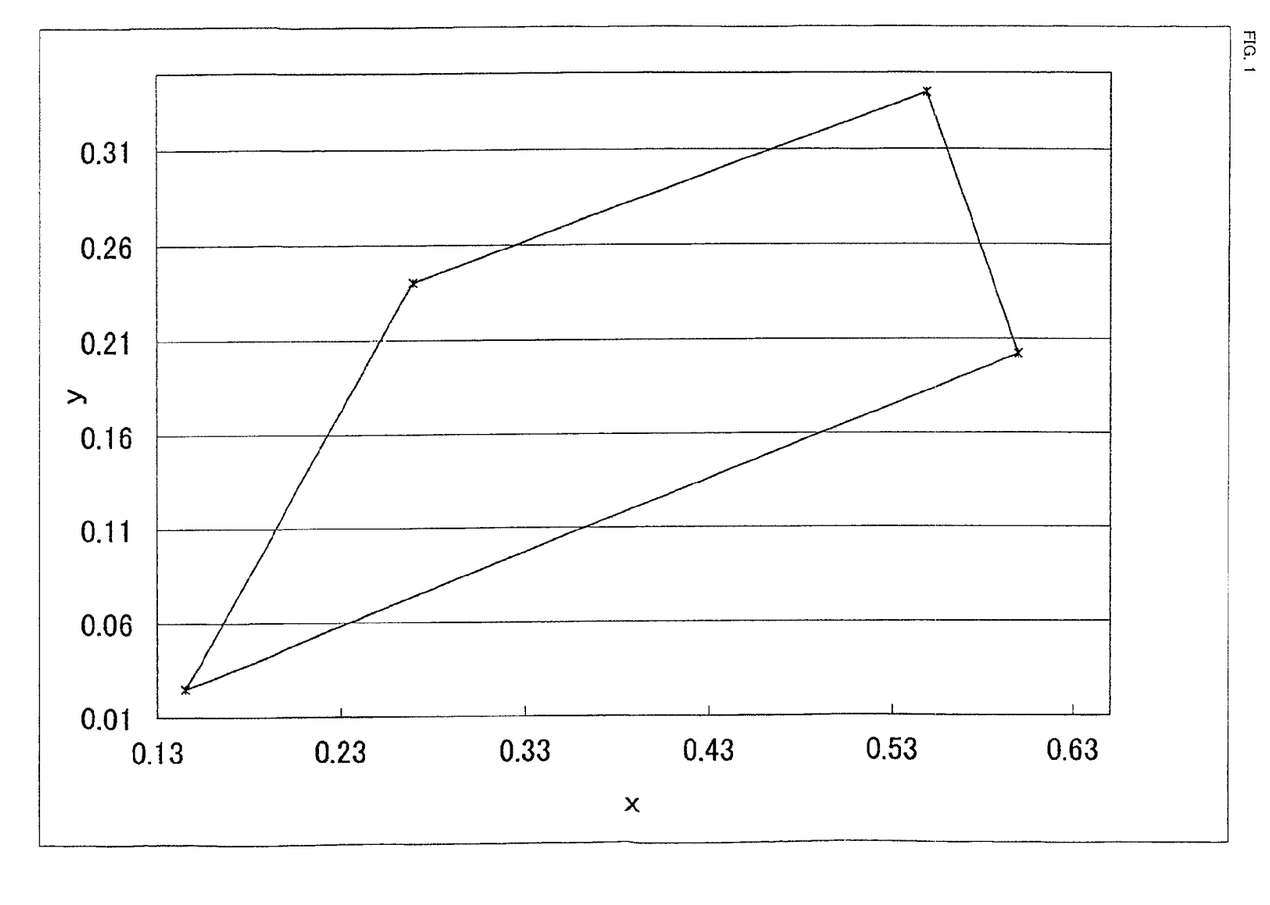
FIG. 1 is a diagram showing a region surrounded by connecting chromatic coordinates (x, y) in sequence: (0.145, 0.025), (0.270,0.240), (0.550,0.340), (0.600,0.202), and then the first (0.145,0.025), with straight lines.
Figure 2:
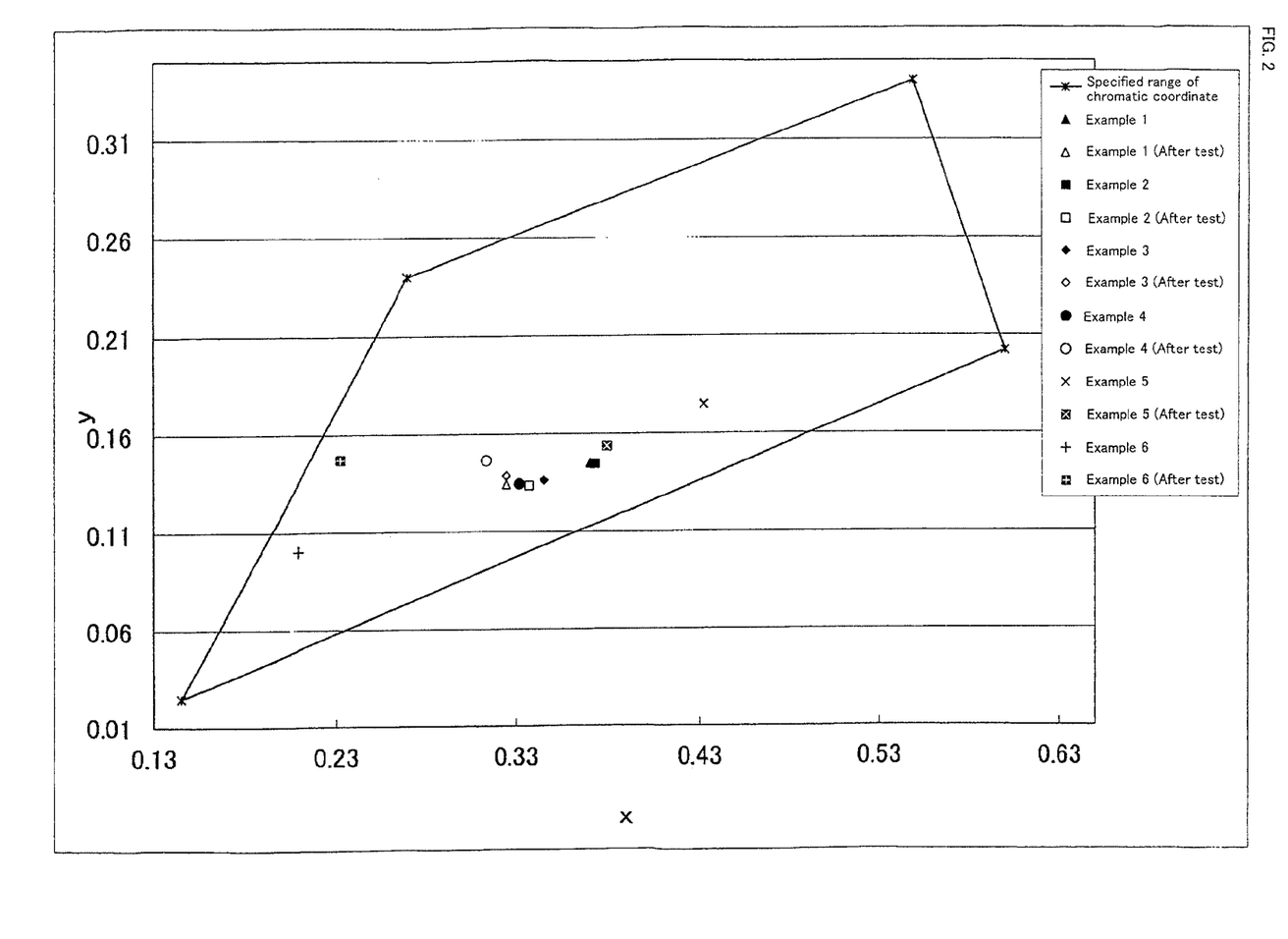
FIG. 2 is a diagram showing a chromatic coordinate (x, y) of the acrylic resin film.
Figure 3:
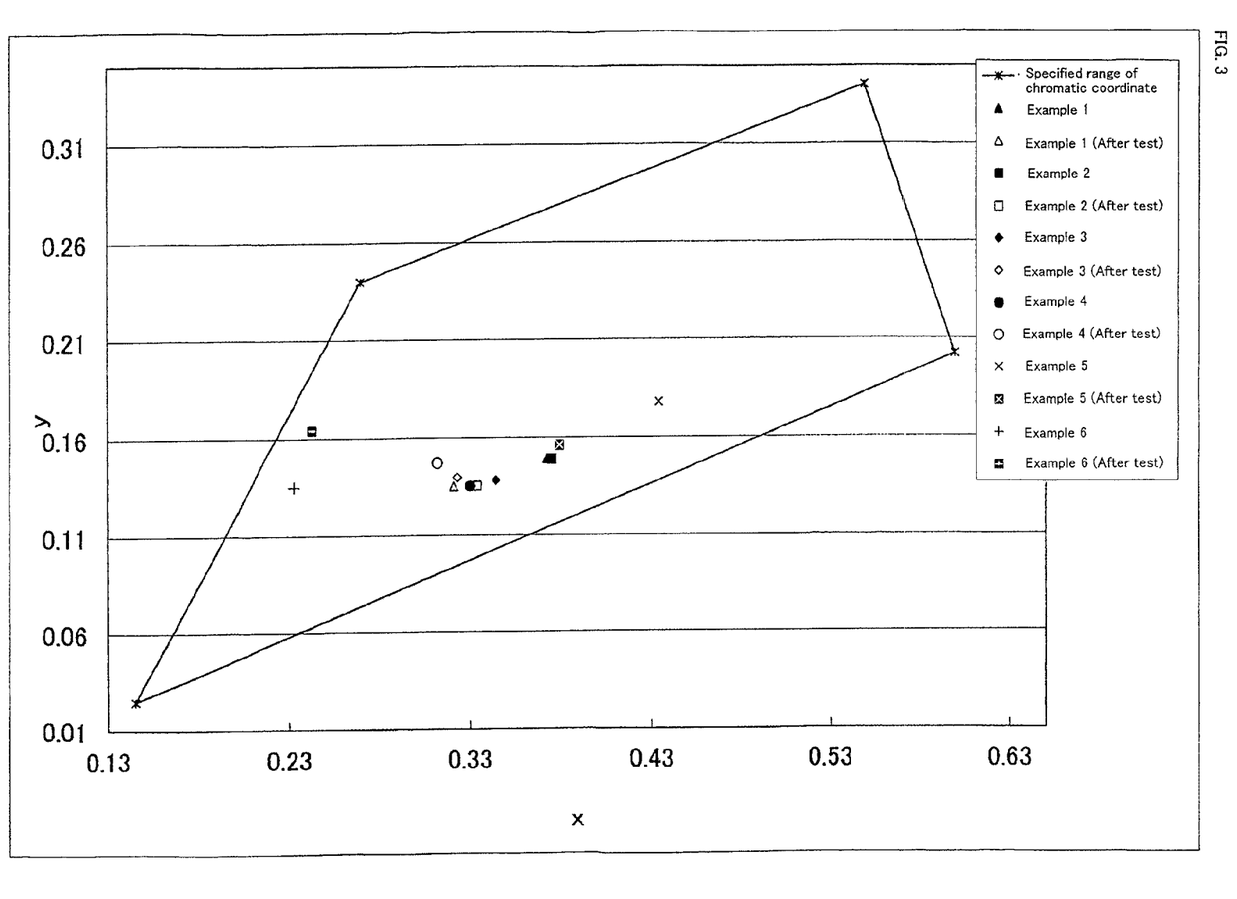
FIG. 3 is a diagram showing a chromatic coordinate (x, y) of a retroreflective sheet in which the acrylic resin film of the present invention is used.

Here, the "range surrounded by four points (0.145, 0.025), (0.270, 0.240), (0.550, 0.340), and (0.600, 0.202)" indicates, as shown in FIG. 1, a region surrounded by connecting chromatic coordinates (x, y) in sequence: (0.145,0.025), (0.270,0.240), (0.550,0.340), (0.600,0.202), and then the first (0.145,0.025) with straight lines.

By using an acrylic resin film having the chromatic coordinate (x, y) within this range as a surface material for a retroreflective sheet, the retroreflective sheet can satisfy a desired chromatic coordinate (x, y) and tends to improve visual recognizability of the retroreflective sheet.

In addition, when a weathering test under the following conditions is conducted for the acrylic resin film obtained, it is preferable that a chromatic coordinate (x, y) is within the range surrounded by abovementioned four points before and after the weathering test; and a shift in the chromatic coordinate (x, y) before and after the weathering test is within ±0.050 in an x-axis direction and within ±0.020 in a y-axis direction. If the shift is within the above described range, a retroreflective sheet with little change in color and having superior visual recognizability can be provided. The shift in the chromatic coordinate (x, y) before and after the test is more preferably within ±0.047 in an x-axis direction and within ±0.017 in a y-axis direction, and further more preferably within ±0.044 in an x-axis direction and within ±0.014 in a y-axis direction.

Weathering Test Conditions: Internal temperature setting: 63° C., UV irradiation intensity: 100 mW/cm$^2$, Test atmosphere: only UV irradiation, No rain, Test duration: 300 hours.

Transparency of the acrylic resin film is preferably 0.10 to 10% in haze. When the haze is 0.10 to 10%, a retroreflective sheet employing this film has a superior appearance and a retroreflective sheet which is superior in visual recognizability can be obtained. The haze is more preferably 0.10 to 8.0%, further more preferably 0.10 to 5.0%, and particularly preferably 0.10 to 1.0%.

Thickness of the acrylic resin film is preferably 10 to 500 μm and more preferably 30 to 200 μm from the viewpoint of handling of the acrylic resin film.

As a method of producing the acrylic resin film, a melt flow method; a T-die method; a melt extrusion method such as inflation method; and a calendaring method can be exemplified, and the T-die method is preferable from the viewpoint of economic efficiency.

After film forming by an extruder and the like, the acrylic resin film can be made into a roll-like article by winding on a tube-like body such as a paper tube by a winder and the like.

A microstructure can be formed on the surface of the acrylic resin film. As a method of forming the microstructure, a thermal transfer method and an etching method can be exemplified.

Among these, the thermal transfer method of heating a die with a microstructure and then pressing the die thus heated onto the surface of the acrylic resin film to form a microstructure is preferable from the viewpoint of productivity and economic efficiency.

As the above described thermal transfer method, a method of hot pressing a die with a microstructure onto an acrylic resin film which is cut out from the roll-like article to transfer the microstructure sheet by sheet, and a continuous molding method of nipping and compressing an acrylic resin film which is unwound from the roll-like article in a heated belt-like die with a microstructure using a nip roller to transfer the microstructure onto the surface of the acrylic resin film can be exemplified.

As a method of producing the above described die with a microstructure, a sand blast method, an etching method, and an electric discharge machining method can be exemplified.

<<Retroreflective Sheet>>

Types of the retroreflective sheet include an encapsulated-lens retroreflective sheet, a capsule type retroreflective sheet with aluminum deposited glass beads embedded in a base material, a prism-type retroreflective sheet employing a resin sheet with prisms formed thereon as a reflector, and the like. The acrylic resin film of the present invention can be used in a state of being layered on a surface of any type of retroreflective sheet.

In a retroreflective sheet with the acrylic resin film according to the present embodiment being layered thereon, a chromatic coordinate (x, y) according to the XYZ colorimetric system measured under the conditions of reflection measurement with 0° illumination, 45° circumferential light receiving, standard light D65, and visual field 10° is preferably within a range surrounded by four points (0.145, 0.025), (0.270, 0.240), (0.550, 0.340), and (0.600, 0.202).

Measurement conditions: The retroreflective sheet and a standard white board are layered and the acrylic resin film side is measured by reflection measurement with 0° illumination, 45° circumferential light receiving, standard light D65, visual field 10°. It should be noted that the standard white board used here is a standard white board that gives XYZ according to the XYZ colorimetric system X=93.96, Y=95.90, Z=113.05 when measured by reflection measurement with 0° illumination, 45° circumferential light receiving, standard light C, visual field 2°.

In addition, the retroreflective sheet of the present embodiment has a reflector element layer, and a chromatic coordinate (x, y) according to the XYZ colorimetric system under the following measurement conditions is preferably within a range surrounded by four points (0.145, 0.025), (0.270, 0.240), (0.550, 0.340), and (0.600, 0.202).

Measurement conditions: The retroreflective sheet and a standard white board are layered and the reflector element layer sheet side is measured by reflection measurement with 0° illumination, 45° circumferential light receiving, standard light D65, visual field 10°. It should be noted that the standard white board used here is a standard white board that gives XYZ according to the XYZ colorimetric system X=93.96, Y=95.90, Z=113.05 when measured by reflection measurement with 0° illumination, 45° circumferential light receiving, standard light C, visual field 2°.

In addition, it is preferable that the chromatic coordinate (x, y) before and after the weathering test under conditions of: internal temperature setting: 63° C.; UV irradiation intensity: 100 mW/cm$^2$; test atmosphere: only UV irradiation; no rain; and test duration: 300 hours, is within a range (X) surrounded by the above specified four points.

The Y value of the retroreflective sheet with the acrylic resin film of the present invention being layered thereon is preferably within a range of 1.5 to 7.5 under the above described measurement conditions. The Y value of at least 1.5 allows effective maintenance of visual recognizability of a retroreflective sheet having a violet color. The Y value of no greater than 7.5 allows effective suppression of apparent whiteness (degree of whiteness) of a retroreflective sheet. The Y value is more preferably 1.7 to 7.3 and further more preferably 1.9 to 7.1.

In addition, it is preferable that a chromatic coordinate (x, y) is within the range surrounded by abovementioned four points before and after the weathering test; and a shift in the chromatic coordinate (x, y) before and after the weathering test is within ±0.050 in an x-axis direction and within ±0.020 in a y-axis direction. If the shift in the chromatic coordinate before and after the weathering test is within the above specified range, the visual recognizability of the retroreflective sheet can be made more preferable even after the weathering test.

The retroreflective sheet can have a structure having the acrylic resin film, the retroreflector element layer, and a binding agent layer, in this order from a light incident side. In addition, it is preferable that the acrylic resin film is used as a surface material, for protection of the retroreflective sheet and impartment of design. The acrylic resin film can be either a single layer or in a multilayer structure of two or more layers.

On a rear face of the binding agent layer (an opposite face of the reflector element layer), a support body layer can be provided for increase of strength of the retroreflective sheet, improvement of size stability, and prevention of penetration of water and/or chemicals. As a material composing the supporting body layer, resin, fiber, fabric, or a thin layer metallic sheet of stainless steel, aluminum or the like can be used either singly or in combination of two or more.

On a rear face of the binding agent layer or the support body layer, an adhesive layer can be provided for joining the retroreflective sheet to a metallic board, a wood board, a glass board, a plastic board and the like, and a separating material layer can further be provided for protecting the adhesive layer. The adhesive and the separating material can be selected as appropriate from well-known ones.

For example, the capsule type retroreflective sheet is produced as follows.

First, upper hemispheres of glass beads are embedded in a temporary supporting body layer; a metallic film is deposited on an entire surface including lower hemispheres of the beads and gaps between the beads; and then, in close contact therewith, a supporting film composed of thermoplastic polymer is formed by coating. Next, the surface is further coated with a film composed of a heat resistant resin or the like; the temporary supporting body layer on an opposite side is separated; and the acrylic resin film of the present embodiment is layered on the upper hemispheres of the glass beads thus exposed. Next, hot pressing using a die with a convex mesh pattern for making desired independent small hollow compartments is performed from a side of the film composed of a heat resistant resin or the like, thereby thermo-fusing the supporting film to bring into partial close contact with the acrylic resin film. And then, the independent small hollow compartments are formed by forming connecting walls corresponding to the pattern, thereby producing the capsule type retroreflective sheet.

In addition, the acrylic resin film can be made directly into the prism-type retroreflective sheet, by directly performing the prism forming on the surface of the acrylic resin film, making the non-prism side a top face and the prism side a retroreflective element.

As a method of producing the prism-type retroreflective sheet directly from the acrylic resin film, a method of forming an acrylic resin film with a microstructure by hot pressing and then forming a sealed encapsulated structure by passing a sheet in which the acrylic film thus obtained and the binding agent layer, or the binding agent layer and the supporting body layer, are integrated, between a die roller with a mesh-like projection and a rubber roller can be exemplified.

EXAMPLES

Hereinafter, the present invention will be explained by way of the Examples. It should be noted that "part(s)" means "part(s) by mass" and "%" means "% by mass". The abbreviations used hereafter are as follows.
MMA: methyl methacrylate
n-BA: n-butyl acrylate
St: styrene
1,3-PD: 1,3-butylene glycol dimethacrylate
AMA: allyl methacrylate
CHP: cumene hydroperoxide
t-BH: t-butyl hydroperoxide
n-OM: n-octylmercaptan
EDTA: ethylenediaminetetraacetic acid
SFS: sodium formaldehyde sulphoxylate (Rongalite)
RS610NA: polyoxyethylene alkyl ether sodium phosphate (manufactured by Toho Chemical Industry Co., Ltd., trade name: phosphanol RS610NA)

Various evaluations regarding the acrylic resin film and the retroreflective sheet have been made according to the following methods.
(1) Measurement of Thermal Weight Loss of Dye The thermal weight loss of a dye was measured under the following measurement conditions (II). The thermal weight loss from 40° C. to 250° C. from the mass of the dye before the test being 100% was determined.
Measurement Conditions (II):
Test device: Differential calorimetry simultaneous measurement device manufactured by Seiko Instruments Inc., model name TG/DTA6200
Test atmosphere: Nitrogen atmosphere, with nitrogen flow rate of 200 ml/min
Test temperature: 40 to 500° C.
Rate of temperature increase: 10° C./min (2) Optical Characteristics of the Acrylic Resin Film (Total Luminous Transmittance and Haze)

Total luminous transmittance and haze of the acrylic resin film immediately after production were measured.

Haze was measured in conformity to JISK7136, by using NDH2000 manufactured by Nihon Denshoku Industries Co., Ltd.
(3) Initial Brightness Y and Chromatic Coordinate (x, y) of Acrylic Resin Film A standard white board that gives XYZ according to the XYZ colorimetric system X=93.96, Y=95.90, Z=113.05 when measured by reflection measurement with 0° illumination, 45° circumferential light receiving, standard light C, visual field 2° was provided. The acrylic resin film was placed on the standard white board, and the brightness Y and the chromatic coordinate (x, y) were measured from the acrylic resin film side under the conditions of reflection measurement with 0° illumination, 45° circumferential light receiving, standard light D65, visual field 10°. In addition, it was confirmed whether the chromatic coordinate (x, y) thus obtained was within a range surrounded by four points (0.145, 0.025), (0.270, 0.240), (0.550, 0.340), and (0.600, 0.202).

It should be noted that the chromatic coordinate was measured by using SE-2000 manufactured by Nihon Denshoku Industries Co., Ltd.
(4) Brightness Y and Chromatic Coordinate (x, y) of Acrylic Resin Film after Weathering Test A standard white board that gives XYZ according to the XYZ colorimetric system X=93.96, Y=95.90, Z=113.05 when measured by reflection measurement with 0° illumination, 45° circumferential light receiving, standard light C, visual field 2° was provided. The acrylic resin film was placed on the standard white board, and the brightness Y and the chromatic coordinate (x, y) were measured from the acrylic resin film side under the conditions of reflection measurement with 0° illumination, 45° circumferential light receiving, standard light D65, visual field 10°. In addition, it was confirmed whether the chromatic coordinate (x, y) thus obtained was within a range surrounded by four points (0.145, 0.025), (0.270, 0.240), (0.550, 0.340), and (0.600, 0.202).

It should be noted that the measurement was made by using SE-2000 manufactured by Nihon Denshoku Industries Co., Ltd. under the above described conditions.

It should be noted that the weathering test was performed under the following conditions (III).
Test device: EYE Super UV Tester manufactured by DAINIPPON PLASTICS CO., LTD., model name SUV-F1
Internal temperature setting: 63° C.
UV irradiation condition: 100 mW/cm² (measured by built-in EYE UV meter)
Lamp: Water-cooled special discharge lamp, model name M04L21WB
Jacket: Quartz tube with limited wavelength 295-450 nm transmission filter, model name WJ50-SUV
Test atmosphere: UV irradiation only, no rain
Test duration: 300 hours
(5) Initial Brightness Y and Chromatic Coordinate (x, y) of Retroreflective Sheet A retroreflective sheet was produced by pasting an acrylic resin film on a commercially available encapsulated-lens retroreflective sheet (White) (manufactured by Avery Dennison, trade name: T-6500). The retroreflective sheet was pasted on a stainless steel plate, and the brightness Y and the chromatic coordinate (x, y) were measured from the acrylic resin film side under the conditions of reflection measurement with 0° illumination, 45° circumferential light receiving, standard light D65, visual field 10°. In addition, it was confirmed whether the chromatic coordinate (x, y) thus obtained was within a range surrounded by four points (0.145, 0.025), (0.270, 0.240), (0.550, 0.340), and (0.600, 0.202).

It should be noted that the chromatic coordinate (x, y) was measured by using SE-2000 manufactured by Nihon Denshoku Industries Co., Ltd.

(6) Brightness Y and Chromatic Coordinate (x, y) of Retroreflective Sheet Before and after Weathering Test The retroreflective sheet after the weathering test was pasted on a stainless steel plate, and the brightness Y and the chromatic coordinate (x, y) were measured from the acrylic resin film side under the conditions of reflection measurement with 0° illumination, 45° circumferential light receiving, standard light D65, visual field 10°. In addition, it was confirmed whether the chromatic coordinate (x, y) thus obtained was within a range surrounded by four points (0.145, 0.025), (0.270, 0.240), (0.550, 0.340), and (0.600, 0.202).

It should be noted that the chromatic coordinate (x, y) was measured by using SE-2000 manufactured by Nihon Denshoku Industries Co., Ltd. The weathering test was performed under the above described conditions (III), with the acrylic resin film side being directed to a light source.

[Preparation Example 1] Production of Rubber Containing Polymer (A-1-1)

195 parts of ion exchange water was poured into a reaction container with a cooling device, heated up to 70° C., and then a mixture prepared by adding 0.10 parts of SFS, 0.0002 parts of ferrous sulfate, and 0.0006 parts of EDTA to 5 parts of ion exchange water was added all at once. And then, while stirring under nitrogen, a mixture containing a monomer component (A-1-1-a-1) composed of 2.3 parts of MMA, 2.13 parts of n-BA, 0.37 parts of St, 0.2 parts of 1,3-BD, 0.01 parts of CHP, and 1.3 parts of emulsifier (RS610NA) was added dropwise to the reaction container for 8 minutes and the reaction was continued for 15 minutes, to thereby obtain a polymer composed of the monomer component (A-1-1-a-1).

Next, a monomer component (A-1-1-a-2) composed of 24.54 parts of n-BA, 4.26 parts of St, 1.2 parts of 1,3-BD, 0.225 parts of AMA, and 0.03 parts of CHP was added to a polymerization container for 90 minutes and the reaction was continued for 60 minutes, to thereby obtain a rubber polymer (A11a). Here, the Tg of the rubber polymer (A11a) was −34° C.

Thereafter, a monomer component (A-1-1-c) composed of 6 parts of MMA, 3.28 parts of n-BA, 0.72 parts of St, 0.15 parts of AMA, and 0.02 parts of CHP was added dropwise to the polymerization container for 30 minutes and the reaction was continued for 60 minutes, to thereby form a polymer. Here, the Tg of the polymer (A11c) composed of the monomer component (A-1-1-c) was 32° C.

Thereafter, a monomer component (A-1-1-b) composed of 52.25 parts of MMA, 2.26 parts of n-BA, 0.49 parts of St, 0.193 parts of n-OM, and 0.055 parts of tBH was added dropwise to the polymerization container for 130 minutes and the reaction was continued for 60 minutes, to thereby obtain acrylic resin latex containing the rubber containing polymer (A-1-1). Here, the Tg of the polymer (A11b) composed of the monomer component (A-1-1-b) was 94° C.

Mass average particle diameter measured after polymerization was 0.09 μm.

The latex of the rubber containing polymer (A-1-1) thus obtained was filtered by using a vibration filtration device with a mesh made of SUS (average aperture: 62 μm) as a filter medium attached thereto, salted out in an aqueous solution containing 3 parts of calcium acetate, collected by washing with water, and dried, to thereby obtain the rubber containing polymer (A-1-1) in a powder form.

Composition of the rubber containing polymer (A-1-1) is shown in Table 1.

[Preparation Example 2] Production of Rubber Containing Polymer (A-1-2)

After charging a container provided with a stirrer and a cooling device with 8.5 parts of ion exchange water, the monomer component (A-1-2-a-1) composed of 0.3 parts of MMA, 4.5 parts of n-BA, 0.2 parts of 1,3-BD, 0.05 parts of AMA, 0.025 parts of CHP was added thereto and stirred for blending. And then, 1.1 parts of RS610NA as an emulsifier was added to the container while stirring, stirring was further continued for 20 minutes, to thereby prepare emulsion containing the monomer component (A-1-2-a-1).

Next, 186.5 parts of ion exchange water was poured into a reaction container with a cooling device, heated up to 70° C., and then a mixture prepared by adding 0.20 parts of SFS, 0.0001 parts of ferrous sulfate, and 0.0003 parts of EDTA to 5 parts of ion exchange water was added at a time. And then, while stirring under nitrogen, emulsion containing a monomer component (A-1-2-a-1) was added dropwise to the reaction container for 8 minutes and the reaction was continued for 15 minutes, to thereby obtain a polymer composed of the monomer component (A-1-2-a-1).

Next, a monomer component (A-1-2-a-2) composed of 1.5 parts of MMA, 22.5 parts of n-BA, 1.0 part of 1,3-BD, 0.25 parts of AMA, and 0.016 parts of CHP was added to the container for 90 minutes and the reaction was continued for 60 minutes, to thereby obtain a rubber polymer (A12a). Here, the Tg of the acrylic rubber polymer (A12a) was −47° C.

Thereafter, a monomer component (A-1-2-c) composed of 6.0 parts of MMA, 4.0 parts of n-BA, 0.075 parts of AMA, and 0.013 parts of CHP was added dropwise to the reaction container for 45 minutes and the reaction was continued for 60 minutes, to thereby form an intermediate polymer. Here, the Tg of the polymer (A12c) composed of the monomer component (A-1-2-c) was 20° C.

Thereafter, a monomer component (A-1-2-b) composed of 55.2 parts of MMA, 4.8 parts of n-BA, 0.22 parts of n-OM, and 0.075 parts of t-BH was added dropwise to the reaction container for 140 minutes and the reaction was continued for 60 minutes, to thereby obtain latex of the rubber containing polymer (A-1-2). Here, the Tg of the polymer (A12b) composed of the monomer component (A-1-2-b) was 84° C.

The latex of the rubber containing polymer (A-1-2) thus obtained was filtered by using a vibration filtration device with a mesh made of SUS (average aperture: 62 μm) as a filter medium attached thereto, salted out in an aqueous solution containing 3 parts of calcium acetate, collected by washing with water, and dried, to thereby obtain the rubber containing polymer (A-1-2) in a powder form.

Composition of the rubber containing polymer (A-1-2) is shown in Table 1.

TABLE 1

|  |  | Materials | Preparation Example 1 (parts) | Preparation Example 2 (parts) |
|---|---|---|---|---|
| Rubber-like polymer (A1a) | A-1-a-1 | MMA | 2.3 | 0.3 |
|  |  | n-BA | 2.13 | 4.5 |
|  |  | St | 0.37 | — |
|  |  | 1,3-BD | 0.2 | 0.2 |
|  |  | AMA | — | 0.05 |
|  |  | Phosphanol RS610NA | 1.3 | 1.1 |
|  |  | CHP | 0.01 | 0.025 |
|  | A-1-a-2 | MMA | — | 1.5 |
|  |  | n-BA | 24.54 | 22.5 |
|  |  | St | 4.26 | — |
|  |  | AMA | 0.225 | 0.25 |
|  |  | 1,3-BD | 1.2 | 1.0 |
|  |  | CHP | 0.03 | 0.016 |
|  |  | Tg | −34° C. | −47° C. |
|  | A-1-c | MMA | 6.0 | 6.0 |
|  |  | n-BA | 3.28 | 4.0 |
|  |  | St | 0.72 | — |
|  |  | AMA | 0.15 | 0.075 |
|  |  | CHP | 0.02 | 0.013 |
|  |  | Tg | 32° C. | 20° C. |
|  | A-1-b | MMA | 52.25 | 55.2 |
|  |  | n-BA | 2.26 | 4.8 |
|  |  | St | 0.49 | — |
|  |  | n-OM | 0.193 | 0.22 |
|  |  | t-BH | 0.055 | 0.075 |
|  |  | Tg | 94° C. | 84° C. |

Example 1

To the acrylic resin (A) composed of 60 parts of the rubber containing polymer (A-1-1) obtained in the Preparation Example 1 and 40 parts of the thermoplastic polymer (A-2), a UV absorber, a light stabilizer, an anti-oxidant, and various coloring agents (B) were added in the composition shown in Table 2, and blended by using a Henschel mixer to obtain an acrylic resin composition. As the UV absorber, Tinuvin 1577 name), which is a triazine UV absorber manufactured by Ciba Specialty Chemicals, was used. As the light stabilizer, LA-57 (trade name), which is a hindered amine light stabilizer manufactured by ADEKA CORPORATION, was used. As the anti-oxidant, Irganox 1076 (trade name), which is a hindered phenol anti-oxidant manufactured by Ciba Specialty Chemicals, was used. As a red pigment, DIMICMBR-165 Red (trade name) manufactured by Dainichiseika Color & Chemicals Mfg. Co., Ltd. containing 50% by mass of an anthraquinone based pigment (C. I. PigmentRed 177) was used. As a blue pigment, DIMIC-MBR-653 Blue (trade name) manufactured by Dainichiseika Color & Chemicals Mfg. Co., Ltd. containing 50% by mass of a copper phthalocyanine compound pigment (C. I. PigmentBlue 15:1) was used. As a violet dye, DIMICMBR-D32 Red (trade name) manufactured by Dainichiseika Color & Chemicals Mfg. Co., Ltd. composed only of an anthraquinone based dye C. I. DisperseViolet 31 was used.

Here, for checking a pigment having a red color, a red acrylic resin film of 75 μm in thickness was produced by using an acrylic resin composition containing 1.5 parts by mass of "DIMICMBR-165 Red (trade name)" containing 50% by mass of the anthraquinone based pigment C. I. PigmentRed 177 (pigment content: 0.75 parts by mass) with respect to 100 parts by mass of the thermoplastic polymer (A-2). The chromatic coordinate (x, y) of the red acrylic resin film was measured to be within a range of (0.648, 0.351), (0.735, 0.265), (0.629, 0.281) and (0.565, 0.346).

For checking a pigment having a blue color, a blue acrylic resin film of 75 μm in thickness was produced by using an acrylic resin composition containing 1.5 parts by mass of "DIMICMBR-653 Blue (trade name)" containing 50% by mass of the copper phthalocyanine compound pigment C. I. PigmentBlue 15:1 (pigment content: 0.75 parts by mass) with respect to 100 parts by mass of the thermoplastic polymer (A-2). The chromatic coordinate (x, y) of the blue acrylic resin film was measured to be within a range of (0.140, 0.035), (0.244, 0.210), (0.190, 0.255) and (0.065, 0.216).

For checking a dye having a violet color, an acrylic resin film of 75 μm in thickness was produced by using an acrylic resin composition containing 1.5 parts by mass of "DIMIC-MBR-D32 Red (trade name)" composed only of the anthraquinone based dye C. I. DisperseViolet31 with respect to 100 parts by mass of the thermoplastic polymer (A-2). The chromatic coordinate (x, y) of the acrylic resin film was measured to be within a range of (0.145, 0.025), (0.270, 0.240), (0.550, 0.340) and (0.600, 0.202).

In addition, the thermal weight loss between 40° C. and 250° C. of the violet dye used here was 0.2%.

The above described acrylic resin composition was supplied to a deaeration type double screw extruder (TEM-35B (trade name) manufactured by TOSHIBA MACHINE CO., LTD.) heated to 240° C., and kneaded to obtain pellets of the acrylic resin composition.

As the thermoplastic polymer (A-2), Dianal BR-75 (manufactured by Mitsubishi Rayon Co., Ltd., reduced viscosity: 0.060 l/g, deflection temperature under load at 1.8 MPa according to JISK7191: 89° C.) was used.

The pellets of the acrylic resin composition thus obtained was formed into a film by using a 40 mmφ (diameter) non-vent screw type extruder (L/D=26) with a T-die of 300 mm in width attached thereto, under conditions of cylinder temperature: 200 to 240° C., T-die temperature: 250° C., and cooling roller temperature 80° C. The acrylic resin film thus obtained was wound on a paper tube by a winder, to thereby obtain a roll-like article of the violet-colored transparent acrylic resin film of 75 μm in thickness.

The haze of the acrylic resin film was 0.93%, which showed that the film has superior transparency. The initial chromatic coordinate (x, y) was within a range surrounded by four points (0.145, 0.025), (0.270, 0.240), (0.550, 0.340), and (0.600, 0.202).

The chromatic coordinate (x, y) after the weathering test was within a range surrounded by four points (0.145, 0.025), (0.270, 0.240), (0.550, 0.340), and (0.600, 0.202), and the Y value was 5.9. The shift in the chromatic coordinate (x, y) was −0.046 in an x-axis direction and −0.011 in a y-axis direction and the shift was slight in both the x-axis direction and the y-axis direction, showing superior weather resistance.

The initial chromatic coordinate (x, y) of a retroreflective sheet with the acrylic resin film thus obtained being pasted thereonto was within a range surrounded by four points (0.145, 0.025), (0.270, 0.240), (0.550, 0.340), and (0.600, 0.202), and the Y value was 2.2.

The chromatic coordinate (x, y) after the weathering test was within a range surrounded by four points (0.145, 0.025), (0.270, 0.240), (0.550, 0.340), and (0.600, 0.202), and the Y value was 2.6. The shift in the chromatic coordinate (x, y) was −0.051 in an x-axis direction and −0.014 in a y-axis direction and the shift was relatively great in the x-axis direction, but still showing superior weather resistance.

The results are shown in Table 2.

Example 2

Production and performed as in Example 1 except for using a pigment and a dye of the types and amounts shown in Table 2 with the same acrylic resin (A) as in Example 1.

The haze of the acrylic resin film was 0.65%, which showed that the film has superior transparency. The initial chromatic coordinate (x, y) was within a range surrounded by four points (0.145, 0.025), (0.270, 0.240), (0.550, 0.340), and (0.600, 0.202).

The chromatic coordinate (x, y) after the weathering test was within a range surrounded by four points (0.145, 0.025), (0.270, 0.240), (0.550, 0.340), and (0.600, 0.202), and the Y value was 5.6. The shift in the chromatic coordinate (x, y) was −0.036 in an x-axis direction and −0.011 in a y-axis direction and the shift was slight in both the x-axis direction and the y-axis direction, showing superior weather resistance.

The initial chromatic coordinate (x, y) of a retroreflective sheet with the acrylic resin film thus obtained being pasted thereonto was within a range surrounded by four points (0.145, 0.025), (0.270, 0.240), (0.550, 0.340), and (0.600, 0.202), and the Y value was 2.2.

The chromatic coordinate (x, y) after the weathering test was within a range surrounded by four points (0,145, 0.025), (0.270, 0.240), (0.550, 0.340), and (0.600, 0.202), and the Y value was 2.4. The shift in the chromatic coordinate (x, y) was −0.041 in an x-axis direction and −0.013 in a y-axis direction and the shift was slight in both the x-axis direction and the y-axis direction, showing superior weather resistance.

The results are shown in Table 2.

Example 3

Production and evaluation were performed as in Example 1 except for using a pigment and a dye of the types and amounts shown in Table 2 with the same acrylic resin (A) as in Example 1.

The haze of the acrylic resin film was 0.55%, which showed that the film has superior transparency. The initial chromatic coordinate (x, y) was within a range surrounded by four points (0.145, 0.025), (0.270, 0.240), (0.550, 0.340), and (0.600, 0.202).

The chromatic coordinate (x, y) after the weathering test was within a range surrounded by four points (0.145, 0.025), (0.270, 0.240), (0.550, 0.340), and (0.600, 0.202), and the Y value was 9.5. The shift in the chromatic coordinate (x, y) was −0.020 in an x-axis direction and +0.002 in a y-axis direction and the shift was slight in both the direction and the y-axis direction, showing superior weather resistance.

The initial chromatic coordinate (x, y) of a retroreflective sheet with the acrylic resin film thus obtained being pasted thereonto was within a range surrounded by four points (0.145, 0.025), (0.270, 0.240), (0.550, 0.340), and (0.600, 0.202), and the Y value was 3.7.

The chromatic coordinate (x, y) after the weathering test was within a range surrounded by four points (0.145, 0.025), (0.270, 0.240), (0.550, 0.340), and (0.600, 0.202), and the Y value was 4.2. The shift in the chromatic coordinate (x, y) was −0.021 in an x-axis direction and +0.002 in a y-axis direction and the shift was slight in both the x-axis direction and the y-axis direction, showing superior weather resistance.

The results are shown in Table 2.

Example 4

Production and evaluation were performed as in Example 1 except for using a pigment and a dye of the types and amounts shown in Table 2 with the same acrylic resin (A) as in Example 1.

The initial haze of the acrylic resin film thus obtained was 0.57%, which showed that the film has superior transparency. The chromatic coordinate (x, y) was within a range surrounded by four points (0.145, 0.025), (0.270, 0.240), (0.550, 0.340), and (0.600, 0.202).

The chromatic coordinate (x, y) after the weathering test was within a range surrounded by four points (0.145, 0.025), (0.270, 0.240), (0.550, 0.340), and (0.600, 0.202), and the Y value was 12.3. The shift in the chromatic coordinate (x, y) was −0.018 in an x-axis direction and +0.012 in a y-axis direction and the shift was slight in both the x-axis direction and the y-axis direction, showing superior weather resistance.

The initial chromatic coordinate (x, y) of a retroreflective sheet with the acrylic resin film thus obtained being pasted thereonto was within a range surrounded by four points (0.145, 0.025), (0.270, 0.240), (0.550, 0.340), and (0.600, 0.202), and the Y value was 4.3.

The chromatic coordinate (x, y) after the weathering test was within a range surrounded by four points (0.145, 0.025), (0.270, 0.240), (0.550, 0.340), and (0.600, 0.202), and the Y value was 5.5. The shift in the chromatic coordinate (x, y) was −0.018 in an x-axis direction and +0.012 in a y-axis direction and the shift was slight in both the x-axis direction and the y-axis direction, showing superior weather resistance.

The results are shown in Table 2.

Example 5

Production and evaluation were performed as in Example 1 except for using only the violet dye in an amount shown in Table 2 with the same acrylic resin (A) as in Example 1.

The haze of the acrylic resin film was 0.26%, which showed that the film has superior transparency. The initial chromatic coordinate (x, y) was within a range surrounded by four points (0.145, 0.025), (0.270, 0.240), (0.550, 0.340), and (0.600, 0.202).

The chromatic coordinate (x, y) after the weathering test was within a range surrounded by four points (0.145, 0.025), (0.270, 0.240), (0.550, 0.340), and (0.600, 0.202), and the Y value was 6.8. The shift in the chromatic coordinate (x, y) was −0.053 in an x-axis direction and −0.021 in a y-axis direction and the shift was large in both the x-axis direction and the y-axis direction, showing substantial change in color after the weathering test.

The initial chromatic coordinate (x, y) of a retroreflective sheet with the acrylic resin film thus obtained being pasted thereonto was within a range surrounded by four points (0.145, 0.025), (0.270, 0.240), (0.550, 0.340), and (0.600, 0.202), and the Y value was 2.8.

The chromatic coordinate (x, y) after the weathering test was within a range surrounded by four points (0.145, 0.025), (0.270, 0.240), (0.550, 0.340), and (0.600, 0.202), and the Y value was 2.9. The shift in the chromatic coordinate (x, y) was −0.055 in an x-axis direction and −0.022 in a y-axis direction and the shift was large in both the x-axis direction and the y-axis direction, showing substantial change in color after the weathering test.

Example 6

Production and evaluation were performed as in Example 1 except for using only the violet pigment in an amount shown in Table 2 as the coloring agent (B) with the acrylic resin (A) composed only of the rubber containing polymer (A-1-2) obtained in Preparation Example 2.

The haze of the acrylic resin film thus obtained was 11.82%, which showed that the film has inferior transparency. The initial chromatic coordinate (x, y) was within a range surrounded by four points (0.145, 0.025), (0.270, 0.240), (0.550, 0.340), and (0.600, 0.202).

The chromatic coordinate (x, y) after the weathering test was within a range surrounded by four points (0.145, 0.025), (0.270, 0.240), (0.550, 0.340), and (0.600, 0.202), and the Y value was 12.4. The shift in the chromatic coordinate (x, y) was +0.024 in an x-axis direction and +0.047 in a y-axis direction and the shift was relatively large in y-axis direction, but still showed superior weather resistance.

The initial chromatic coordinate (x, y) of a retroreflective sheet with the acrylic resin film thus obtained being pasted thereonto was within a range surrounded by four points (0.145, 0.025), (0.270, 0.240), (0.550, 0.340), and (0.600, 0.202), and the Y value was 2.8.

The chromatic coordinate (x, y) after the weathering test was within a range surrounded by four points (0.145, 0.025), (0.270, 0.240), (0.550, 0.340), and (0.600, 0.202), and the Y value was 6.5. The shift in the chromatic coordinate (x, y) was +0.010 in an x-axis direction and +0.029 in a y-axis direction and the shift was relatively large in y-axis direction, but still showing superior weather resistance.

The results are shown in Table 2.

As described above, the present invention can provide an acrylic resin film having a violet color that is superior in weather resistance and transparency, as well as a retroreflective sheet employing the film.

The invention claimed is:

1. An acrylic resin film comprising an acrylic resin composition including an acrylic resin (A) and a coloring agent (B) composed of at least one of: a red coloring agent; a blue coloring agent; and a violet coloring agent,
   wherein a chromatic coordinate (x, y) according to the XYZ colorimetric system under the following measurement conditions is within a range surrounded by four points (0.145, 0.025), (0.270, 0.240), (0.550, 0.340), and (0.600, 0.202):
   Measurement conditions: The acrylic resin film and a standard white board are layered and the acrylic resin film side is measured by reflection measurement with 0° illumination, 45° circumferential light receiving, standard light D65, visual field 10°, wherein the standard white board gives XYZ according to the XYZ colorimetric system X=93.96, Y=95.90, Z=113.05 when measured by reflection measurement with 0° illumination, 45° circumferential light receiving, standard light C, visual field 2°.

2. The acrylic resin film according to claim 1, wherein a content of the coloring agent (B) with respect to 100 parts by mass of the acrylic resin (A) is 0.3 to 3.0 parts by mass.

3. The acrylic resin film according to claim 1, wherein a haze of the acrylic resin film is 0.10 to 10%.

TABLE 2

| | | | | | Example 1 | Example 2 | Example 3 | Example 4 | Example 5 | Example 6 |
|---|---|---|---|---|---|---|---|---|---|---|
| Acrylic resin composition | Acrylic resin (A) | Rubber-containing polymer (A-1) | | A-1-1 | 80 | 60 | 60 | 60 | 60 | — |
| | | | | A-1-2 | — | — | — | — | — | 100 |
| | | Thermoplastic polymer (II) | | A-2 | 40 | 40 | 40 | 40 | 40 | — |
| | Coloring agent (B) | Red pigment | Anthraquinone-based C.I. Pigment Red 165 | MBR-165 Red | 0.09 | — | — | — | — | — |
| | | Blue pigment | Phthalocyanine-based C.I. Pigment Blue 15:1 | MBR-653 Blue | 0.075 | 0.053 | 0.018 | 0.018 | — | — |
| | | Purple dye | Anthraquinone-based CI Disperse Violet 31 | MBR-D32 Red | 1.24 | 1.52 | 0.81 | 0.61 | 1.8 | — |
| | | Purple pigment | Dioxazine-based C.I. Pigment Violet 37 | MBR-120220 Violet | — | — | — | — | — | 0.8 |
| | | Total amount of pigment/Total amount of dye | | | 1/8 | 1/29 | 1/46 | 1/34 | — | — |
| | | Various additives | | Tinuvin 1577 | 1.5 | 1.5 | 1.5 | 1.5 | 1.5 | — |
| | | | | LA-31 | — | — | — | — | — | 1.5 |
| | | | | LA-57 | 0.2 | 0.2 | 0.2 | 0.2 | 0.2 | 0.2 |
| | | | | Irganox 1076 | 0.1 | 0.1 | 0.1 | 0.1 | 0.1 | 0.1 |
| Physical Property Evaluation Criteria | Acrylic resin film | Optical properties | | Total light transmittance (%) | 13.22 | 13.12 | 17.64 | 19.97 | 14.39 | 10.35 |
| | | | | Haze (%) | 0.93 | 0.65 | 0.55 | 0.57 | 0.26 | 11.82 |
| | | Y value and chromatic coordinate (x, y) | Initial | Y | 4.4 | 4.5 | 7.8 | 9.0 | 5.9 | 3.7 |
| | | | | x | 0.3709 | 0.3733 | 0.3456 | 0.3322 | 0.4332 | 0.2090 |
| | | | | y | 0.1455 | 0.1451 | 0.1368 | 0.1349 | 0.1752 | 0.1003 |
| | | | After weathering test | Y | 5.9 | 5.6 | 9.5 | 12.3 | 6.8 | 12.4 |
| | | | | x | 0.3252 | 0.3376 | 0.3252 | 0.3139 | 0.3798 | 0.2328 |
| | | | | y | 0.1348 | 0.1340 | 0.1390 | 0.1469 | 0.1540 | 0.1475 |
| | | Shift in chromatic coordinate (x, y) after weathering test | x-axis direction | | −0.046 | −0.036 | −0.020 | −0.018 | −0.053 | +0.024 |
| | | | y-axis direction | | −0.011 | −0.011 | +0.002 | +0.012 | −0.021 | +0.047 |
| | Retroreflective sheet | Y value and chromatic coordinate (x, y) | Initial | Y | 2.2 | 2.2 | 3.7 | 4.3 | 2.8 | 2.8 |
| | | | | x | 0.3727 | 0.3755 | 0.3450 | 0.3305 | 0.4350 | 0.2331 |
| | | | | y | 0.1491 | 0.1488 | 0.1380 | 0.1352 | 0.1779 | 0.1350 |
| | | | After weathering test | Y | 2.6 | 2.4 | 4.2 | 5.5 | 2.9 | 6.5 |
| | | | | x | 0.3216 | 0.3345 | 0.3237 | 0.3126 | 0.3799 | 0.2431 |
| | | | | y | 0.1352 | 0.1354 | 0.1396 | 0.1471 | 0.1560 | 0.1643 |
| | | Shift in chromatic coordinate (x, y) after weathering test | x-axis direction | | −0.051 | −0.041 | −0.021 | −0.018 | −0.055 | +0.010 |
| | | | y-axis direction | | −0.014 | −0.013 | +0.002 | +0.012 | −0.022 | +0.029 |

4. The acrylic resin film according to claim 1, wherein the coloring agent (B) includes at least a violet coloring agent containing a violet dye, and
    a content of the violet dye with respect to 100 parts by mass of the acrylic resin (A) is 0.5 to 3.0 parts by mass.

5. The acrylic resin film according to claim 4, wherein thermal weight loss of the violet dye between 40° C. and 250° C. under the following measurement conditions is no greater than 1.0%:
    Measurement conditions test atmosphere: inert gas atmosphere;
        test temperature: 40 to 500° C.;
        rate of temperature increase: 10° C./min.

6. The acrylic resin film according to claim 1, wherein: the coloring agent (B) includes a blue coloring agent containing a blue pigment and/or a red coloring agent containing a red pigment; and a content of the blue pigment and/or the red pigment with respect to 100 parts by mass of the acrylic resin (A) is 0.001 to 1.0 parts by mass.

7. The acrylic resin film according to claim 1, wherein the coloring agent (B) comprises a pigment and a dye, and a ratio of a total amount of the pigment to a total amount of the dye (total amount of the pigment/total amount of dye) is ⅓ to 1/70.

8. The acrylic resin film according to claim 1, wherein: the chromatic coordinate (x, y) is within the abovementioned range before and after a weathering test; and a shift in the chromatic coordinate (x, y) before and after a weathering test is within ±0.050 in an x-axis direction and within ±0.020 in a y-axis direction.

9. A retroreflective sheet including the acrylic resin film according to claim 1, wherein a chromatic coordinate (x, y) of the retroreflective sheet according to the XYZ colorimetric system is within the abovementioned range.

10. The retroreflective sheet according to claim 9, wherein the Y value of the retroreflective sheet according to the XYZ colorimetric system is 1.5 to 7.5.

11. The retroreflective sheet according to claim 9, wherein a reflector element layer is a bead-shaped lens or a prism-shaped lens.

12. The retroreflective sheet according to claim 9, wherein: the chromatic coordinate (x, y) is within the abovementioned range before and after a weathering test; and a shift in the chromatic coordinate (x, y) before and after a weathering test is within ±0.050 in an x-axis direction and within ±0.020 in a y-axis direction.

13. A retroreflective sheet comprising a reflector element layer, wherein a chromatic coordinate (x, y) according to the XYZ colorimetric system under the following measurement conditions is within a range surrounded by four points (0.145, 0.025), (0.270, 0.240), (0.550, 0.340), and (0.600, 0.202):
    Measurement conditions: The retroreflective sheet and a standard white board are layered and the retroreflective sheet side is measured by reflection measurement with 0° illumination, 45° circumferential light receiving, standard light D65, visual field 10° wherein the standard white board gives XYZ according to the XYZ colorimetric system X=93.96, Y=95.90, Z=113.05 when measured by reflection measurement with 0° illumination, 45° circumferential light receiving, standard light C, visual field 2°.

14. The retroreflective sheet according to claim 13, wherein the Y value according to the XYZ colorimetric system is at least 1.5 and no greater than 7.5.

15. The retroreflective sheet according to claim 13, wherein the reflector element layer is a bead-shaped lens or a prism-shaped lens.

* * * * *